March 30, 1943. A. RAPPL 2,315,350
WIPER ARM CONNECTION
Filed Aug. 15, 1940 2 Sheets-Sheet 1
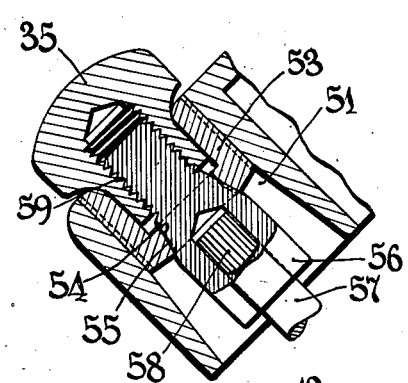
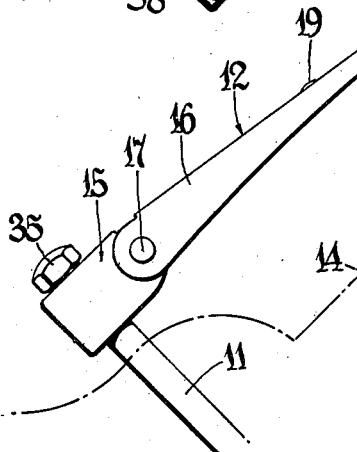
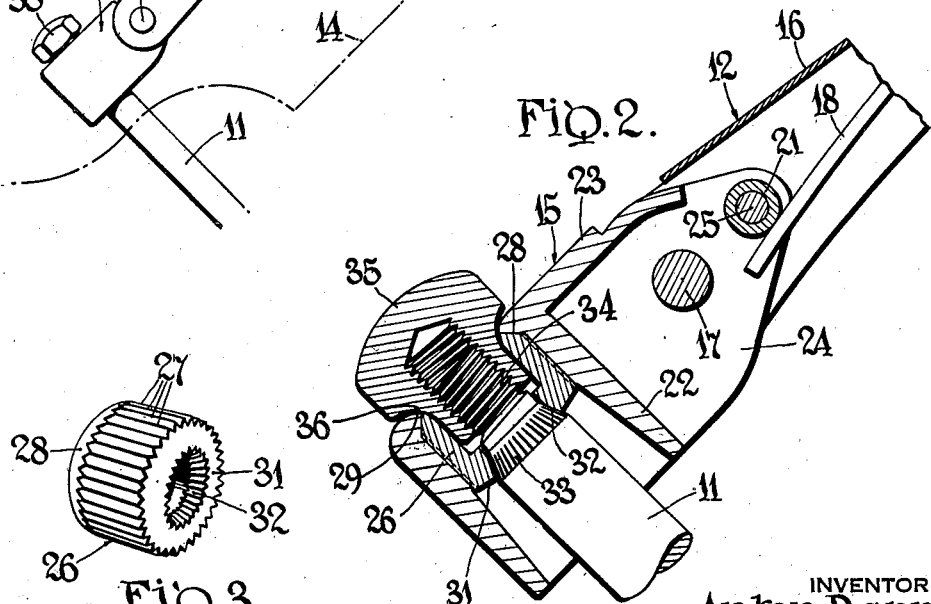
INVENTOR
Anton Rappl,
BY
Beau, Brooks, Buckley & Beau.
ATTORNEYS March 30, 1943.  A. RAPPL  2,315,350
WIPER ARM CONNECTION
Filed Aug. 15, 1940  2 Sheets-Sheet 2
Fig. 5.
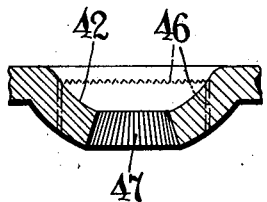
Fig. 6.
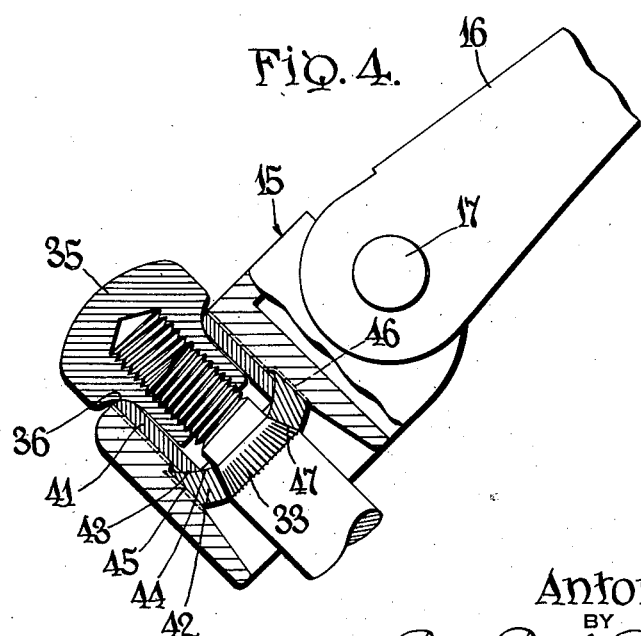
INVENTOR
Anton Rappl,
BY
Beau, Brooks, Buckley & Beau.
ATTORNEYS Patented Mar. 30, 1943

2,315,350

UNITED STATES PATENT OFFICE 2,315,350

WIPER ARM CONNECTION

Anton Rappl, Buffalo, N. Y., assignor to Trico Products Corporation, Buffalo, N. Y.

Application August 15, 1940, Serial No. 352,761

8 Claims. (Cl. 287—52.02)

This invention relates to windshield cleaners and has particular relation to an improved means for connecting the drive shaft of the cleaner to the wiper arm thereof, to a novel annular member which is a part of the connecting means, and to the method of producing the annular member.

The actuating shaft of a windshield cleaner is usually of a hard metal, such as steel, and it is desirable to form the adjacent part of the wiper arm by die-casting, the metal used for such casting being relatively soft and having a tendency to deform under continued pressure. As a result of this characteristic of the metal, such a wiper arm part, when clamped to the shaft by a screw threaded fastener, will gradually deform, allowing the connection to the shaft to loosen.

The present invention contemplates an improved connection means for the shaft and wiper arm wherein a rigid tubular stress receiving member is provided for the deformable wiper arm, such tubular member being embedded in or otherwise secured to the wiper arm part and bearing directly on the clamping surfaces of the wiper shaft and screw threaded fastener.

The invention further contemplates a construction wherein the tubular stress receiving member comprises an annulus whose central aperture is of tapered or frusto-conical form adapted to receive a shoulder, of similar form, on the wiper shaft.

These and other objects and advantages will become apparent from the following description of the typical embodiments of the invention shown in the accompanying drawings, wherein:

Fig. 1 is a side elevational view of a windshield cleaner assembly;

Fig. 2 is an enlarged sectional view showing the connection between the shaft and the adjacent portion of the arm;

Fig. 3 is a perspective view of a stress receiving member appearing in section in Fig. 2;

Fig. 4 is a view similar to Fig. 2 but illustrating a modified form of connection;

Fig. 5 is a sectional view showing the result of the first step in the production of a part of a stress receiving means illustrated in Fig. 4;

Fig. 6 is a sectional view showing the result of a second step in the production of said part; and, Fig. 7 is a fragmentary view similar to Fig. 2 and illustrating a further modified construction.

As shown in Fig. 1, the windshield cleaner assembly may include a shaft 11 connected to a motor or other drive means, a wiper arm 12 connected to the shaft and carrying at its outer end a wiper blade 13 which may be oscillated by the shaft in wiping engagement with a windshield glass 14. The arm 12 may comprise an inner section 15 preferably die-cast from suitable die-casting metal, and an outer section 16 pivoted to the inner section by a pivot 17, a leaf spring 18 secured to the outer section by rivet 19 pressing against a roller 21 carried by the inner section, thereby serving to urge the outer arm section and the blade carried thereby about the axis of the pivot 17 into wiping engagement with the glass and to maintain the arm and blade in such engagement under wiping pressure.

The inner arm section 15 made of metal which is subject to cold flow under pressure may comprise a tubular portion 22 surrounding the outer end of the shaft 11, a front wall 23 and spaced side walls 24 which carry the pivot pin 17 and also the pin 25 which supports the roller 21.

Embedded within the tubular portion 22 of the inner arm section, either by being pressed therein or by being placed therein as an insert during the die-casting of the section 15, is a stress receiving member 26. The latter is preferably of steel or other hard and rigid material as compared with the material comprising the arm section 15, and is of generally tubular form, with longitudinally extending flutes or serrations 27 on its outer cylindrical surface intimately contacting the adjacent, and complementary, portion of the inner arm section. The forward end face of member 26 is preferably beveled as indicated at 28 and overhanging this face is an annular bead 29 on tubular part 22.

Adjacent its opposite end face 31 the inner surface of the member 26 is of frusto-conical form, indicated at 32, complementary to and seating upon a frusto-conical shoulder 33 formed on the shaft 11. Preferably the surfaces 32 and 33 are provided with longitudinally extending mating serrations serving to key together the parts 11 and 26. Forwardly of shoulder 33 the shaft is provided with a screw threaded portion 34 upon which is threaded fastener 35, in the form of a cap nut, having a surface portion 36 engaging the forward end of member 26 for maintaining the latter clamped upon shoulder 33.

It will be understood that the fastener 35 may be screwed very tightly onto the shaft, subjecting member 26 to heavy compressive forces. The latter, however, are not applied to the die-cast metal 15 and hence, the flowing of the latter when placed under continued high pressure, hereinbefore discussed, is obviated.

In the form of the invention depicted in Fig. 4, the tubular stress receiving means comprises, instead of member 26, the members 41 and 42. Member 41 is of tubular form having a serrated outer surface, a front face engaged at 36 by fastener 35 and a rear face 43 shaped to fit the adjacent, or forward face 44 of the other member, 42. The latter member is an annulus whose outer face 45 is of substantially cylindrical outline and provided with serrations 46 for keying engagement with the adjacent portions of arm part 15; and whose inner face 47 is, like face 32 of member 26, of frusto-conical outline, and preferably provided with longitudinally extending serrations for mating with like serrations on shoulder 33 of the shaft.

It will be appreciated that members 41 and 42 function in the same manner as member 26, and may be embedded in arm part 15 either during the die-casting of the latter, or, subsequently to such die-casting, by pressing them into a suitable opening preformed in the part 15.

The member 42 may be economically produced by first forming, by any suitable means, an opening of substantially cylindrical form, in a metal blank, as shown in Fig. 5, the cylindrical surface being provided with longitudinal serrations or flutes appearing as vertical lines in Fig. 5.

By a stamping operation the blank shown in Fig. 5 may be dished to the form shown in Fig. 6, this stamping operation so deforming the metal around the opening that the latter assumes a substantially frusto-conical form. The blank may be trimmed by a punching operation to remove excess material and to provide the serrations or flutes 46. Such trimming may, if desired, be done in the same operation with the stamping of the blank into the dished form shown in Fig. 6.

By this novel method of producing the member 42 the difficulties attending the usual methods of forming a frusto-conical, and serrated, opening of such relatively small diameter in a member of this character are obviated, and the speed and cost of manufacture are greatly reduced.

In the further modified form of the invention illustrated in Fig. 7, the inner arm section is shown as having a tubular portion 51 within which is embedded a stress receiving member 53, either pressed therein or placed therein as an insert during die-casting of the arm section. The outer cylindrical surface of the member 53 is provided with longitudinally extending flutes or serrations which may extend substantially the entire length of the surface that engages the arm section.

The inner frusto-conical surface 54 of the stress receiving member may likewise be provided with longitudinally extending flutes or serrations for engagement with the frusto-conical shoulder 55 on the tip 56 of the shaft. In the illustrated construction the tip 56 is preferably formed of brass and is pressed onto the serrated end 58 of a steel shaft 57, and the frusto-conical surface 55 may be indented or bitten into by the serrations on surface 54 of the stress receiving member when the cap nut 35 is tightly turned onto the screw threaded portion 59 of the shaft. In the event, however, that the material comprising the end of the shaft is relatively hard, or if otherwise desired, serrations may be preformed in the surface 55.

It will be understood that the structures and method herein shown and described are merely illustrative of the inventive principles involved, and that these principles may be otherwise embodied without departing from the spirit of the invention or the scope of the appended claims.

I claim:

1. In a windshield cleaner, a shaft having a tapered portion with a serrated surface and a screw threaded portion adjacent thereto, a wiper arm part of die-cast metal having secured therein a rigid member seating in engagement upon said tapered portion of the shaft, and a fastener threaded to said screw threaded portion of the shaft and engaging directly upon said rigid member for subjecting the same to compression in clamping the latter upon said tapered portion of the shaft without subjecting said arm part to compression.

2. In a windshield cleaner, a wiper arm part of deformable die-cast material having embedded therein a relatively harder rigid member of substantially tubular form having exposed end surfaces, one of said exposed surfaces adapted for abutting a shoulder on an actuating shaft element, and the other exposed end surface of said rigid member being engageable by a nut for clamping the latter in abutment with said shoulder without subjecting the die-cast part to compression.

3. In a windshield cleaner, a shaft having a frusto-conical shoulder thereon and a screw threaded portion adjacent thereto, a wiper arm part of die-cast material, rigid stress receiving means therefor of tubular form having circumferential portions provided with serrations embedded in said die-cast part, one end of the stress receiving means being complementary to and engaging upon said frusto-conical shoulder, and a fastener threaded to said screw threaded portion of said shaft and engaging the opposite end portion of the stress receiving means for clamping it upon said shoulder independent of the die-cast part whereby the latter is without compression by said fastener.

4. In a windshield cleaner, a shaft having a frusto-conical shoulder thereon having longitudinal serrations and a screw threaded portion adjacent said shoulder, a wiper arm part of deformable material and rigid stress receiving means therefor comprising an annular member having a frusto-conical aperture, the frusto-conical surface of said annular member about the aperture engaging said shoulder and a tubular member having one end engaging said annular member, and a fastener threaded to said screw threaded portion of the shaft and engaging the opposite end portion of the tubular member for clamping the annular member upon the shoulder.

5. In a windshield cleaner, a shaft having a frusto-conical shoulder thereon having longitudinal serrations and a screw threaded portion adjacent said shoulder, a wiper arm part of deformable material and rigid stress receiving means therefor comprising an annular member having a frusto-conical aperture, the frusto-conical surface of said annular member about the aperture engaging said shoulder and a tubular member having one end engaging said annular member, and a fastener threaded to said screw threaded portion of the shaft and engaging the opposite end portion of the tubular member for clamping the annular member upon the shoulder, said annular member having its outer surface of substantially cylindrical form with longitudinal serrations therein engaging the deformable material and the surface of the frusto-conical aperture having serrations complementary to the serrations on said shoulder.

6. In a windshield cleaner, a shaft having a tapered portion and a screw threaded portion adjacent thereto, a wiper arm part of die-cast metal having secured therein a relatively harder rigid member seating in engagement upon said tapered portion of the shaft, and a fastener threaded to said screw threaded portion of the shaft and engaging directly said rigid member for clamping the latter upon said tapered portion of the shaft independently of the die-cast metal part whereby the latter is without compression by said fastener.

7. In a windshield cleaner, a shaft element having a shoulder and a screw threaded portion, a wiper arm part of material that is subject to cold flow under continued pressure and having keyed thereto a relatively harder rigid member having exposed end surfaces, one of said surfaces abutting said shoulder, and a fastener element threaded to said threaded portion of the shaft and engaging the other end surface of said rigid member for clamping the latter in abutment with said shoulder while leaving the arm part free of compression by said fastener element.

8. In a windshield cleaner, a shaft element having a shoulder and a screw threaded portion, a wiper arm part of die-cast material and having keyed thereto a rigid member having exposed end surfaces, one of said surfaces abutting said shoulder, and a fastener element threaded to said threaded portion of the shaft and engaging the other end surface of said rigid member for clamping the latter in abutment with said shoulder while leaving the arm part free of compression by said fastener element.

ANTON RAPPL.